United States Patent
Chen et al.

(10) Patent No.: US 6,856,886 B1
(45) Date of Patent: Feb. 15, 2005

(54) VEHICLE STABILITY ENHANCEMENT CONTROL AND METHOD

(75) Inventors: Shih-Ken Chen, Troy, MI (US); William C. Lin, Troy, MI (US); Yuen-Kwok S. Chin, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/806,674

(22) Filed: Mar. 23, 2004

(51) Int. Cl.⁷ .............................................. G06F 19/00
(52) U.S. Cl. ........................ 701/70; 701/36; 303/146; 477/34; 477/107; 340/438
(58) Field of Search .............................. 701/82, 74, 41, 701/36; 303/166, 167, 146; 180/204, 446, 443; 340/438; 477/34, 115, 107

(56) References Cited

U.S. PATENT DOCUMENTS

| | | | |
|---|---|---|---|
| 5,720,533 A | 2/1998 | Pastor et al. | |
| 6,035,251 A | 3/2000 | Hac et al. | |
| 6,122,584 A | 9/2000 | Lin et al. | |
| 6,374,172 B1 * | 4/2002 | Yamaguchi et al. | 701/90 |
| 6,456,920 B1 * | 9/2002 | Nishio et al. | 701/70 |
| 6,658,342 B1 * | 12/2003 | Hac | 701/70 |
| 6,662,898 B1 * | 12/2003 | Mattson et al. | 180/446 |
| 2003/0125864 A1 * | 7/2003 | Banno et al. | 701/84 |

FOREIGN PATENT DOCUMENTS

| | | | | |
|---|---|---|---|---|
| JP | 10181552 A | * | 7/1998 | B60T/8/24 |
| JP | 2001004650 A | * | 1/2001 | G01P/15/00 |

* cited by examiner

Primary Examiner—Thomas G. Black
Assistant Examiner—Tuan C To
(74) Attorney, Agent, or Firm—Kathryn A. Marra

(57) ABSTRACT

A side-slip velocity estimation module for a vehicle stability enhancement control system includes a side-slip acceleration estimation module that determines an estimated side-slip acceleration of a vehicle. A limited-frequency integrator integrates the estimated side-slip acceleration to determine an estimated side-slip velocity of the vehicle. The limited-frequency integrator includes a feedback loop which incorporates a cutoff frequency for the integrator.

28 Claims, 11 Drawing Sheets

VEHICLE STABILITY ENHANCEMENT CONTROL AND METHOD

TECHNICAL FIELD

The present invention relates generally to vehicles and vehicle stability control systems. The present invention relates more particularly to vehicle stability control systems comprising a vehicle side-slip feedback control.

BACKGROUND OF THE INVENTION

There are two motions that take place when a vehicle turns. The first motion is a turning motion called yaw motion. Yaw motion takes place as the vehicle body spins around an imaginary vertical axis that is substantially perpendicular to the ground. The second motion is a lateral sliding motion called side-slip motion. Side-slip motion occurs in the same direction as the turn or in the opposite direction depending on the speed of the vehicle.

A desired yaw rate and a desired side-slip velocity are determined based on the speed of a vehicle and the position of the steering wheel. The desired values correspond to the expected yaw rate and side-slip velocity when a vehicle is traveling on a dry and clean surface. A driver may sense instability when either the actual yaw rate or side-slip velocity, or both of them, significantly exceeds the expected value.

In a vehicle stability enhancement system, the actual yaw rate and side-slip velocity of the vehicle are compared to their desired values. Corrective action is taken when either of their desired values is exceeded by a predetermined threshold. When a significant discrepancy exists between either the desired yaw rate and the actual yaw rate or the desired side-slip velocity and the actual side-slip velocity of the vehicle, or both of them, it is likely the road conditions necessitate vehicle stability enhancement.

Current methods of vehicle stability enhancement include using yaw rate feedback and side-slip acceleration feedback control signals. The yaw rate of a vehicle can be measured using a commercially available yaw rate sensor. The side-slip velocity of a vehicle can be measured using a side-slip velocity sensor, or sensors, which is currently very expensive. Instead of using a side-slip velocity sensor, side-slip acceleration can be estimated based on the lateral acceleration, yaw rate, and speed of a vehicle. Ideally, the side-slip velocity of a vehicle can be obtained by integrating the side-slip acceleration. However, since sensor bias exists in the signals associated with yaw rate sensors and lateral accelerometers, the integration tends to drift due to the integration of the unwanted bias signal.

In one conventional approach, a vehicle stability enhancement system uses yaw rate feedback and side-slip angle feedback (which can be derived from side-slip velocity) to create a corrective yaw moment to enhance stability and improve the dynamic behavior of a vehicle. The estimation of side-slip velocity is implemented using a dynamic observer that captures the estimated state of dynamics of the vehicle. However, the estimation is based on the cornering compliances of the vehicle corners, which are variable vehicle parameters. The cornering compliances vary over a wide range and depend on a number of factors, including the type of surface that the vehicle is operating on. Therefore, the estimate of side-slip velocity is not as accurate as desired.

In another approach, set forth in commonly-assigned, co-pending U.S. patent application Ser. No. 10/305,378 filed on Nov. 26, 2002, which is hereby incorporated herein by reference in its entirety, a vehicle stability enhancement control system uses an open loop rear wheel steering angle command in combination with rear wheel yaw rate feedback and rear wheel side-slip rate feedback to create a corrective yaw moment to enhance stability and improve the dynamic behavior of a vehicle.

In yet another approach set forth in commonly-assigned, co-pending U.S. patent application Ser. No. 10/404,371 filed on Apr. 1, 2003, which is hereby incorporated herein by reference in its entirety, a vehicle stability enhancement control system includes a side-slip velocity estimation module. A side-slip acceleration estimation module determines an estimated side-slip acceleration of a vehicle. In the side slip acceleration module, a limited-frequency integrator integrates the estimated side-slip acceleration to determine an estimated side-slip velocity of the vehicle. The estimated side-slip acceleration is determined based on a yaw rate, a lateral acceleration, and a speed of the vehicle. A reset logic module clears an output of the limited-frequency integrator when a first condition occurs. The first condition is a straight-driving condition that is determined based on a yaw rate, a lateral acceleration, and an angle of a steering wheel of the vehicle. The first condition is a speed condition that is based on a speed of the vehicle. The first condition is a sensor bias condition that is based on the estimated side-slip acceleration. The estimated side-slip velocity is compared to a desired side-slip velocity to produce a side-slip control signal. The side-slip control signal is combined with a yaw rate control signal to produce an actuator control signal. The actuator control signal is received by at least one brake actuator that applies a brake pressure difference across at least one axle of the vehicle to create a yaw moment to correct a dynamic behavior of the vehicle. The actuator control signal is received by a rear-wheel steering actuator that turns a set of rear wheels of the vehicle to create a yaw moment to enhance stability and improve the dynamic behavior of the vehicle. The limited-frequency integrator includes a feedback control loop. The accuracy of the integrator determines the accuracy of the side-slip velocity determined thereby, and hence, the accuracy and performance of the overall stability enhancement control system. The accuracy of the limited frequency integrator can be improved by improving the accuracy of the frequency cutoff associated therewith.

Therefore, it is desirable to improve the accuracy of the frequency cutoff of the limited frequency integrator in order to improve the accuracy and performance, and hence the usefulness, of the integrator, and in turn to improve the performance of the vehicle stability enhancement control system which is based thereon.

SUMMARY OF THE INVENTION

A vehicle stability enhancement control system according to the present invention includes a side-slip velocity estimation module. A side-slip acceleration estimation module determines an estimated side-slip acceleration of a vehicle. A limited-frequency integrator integrates the estimated side-slip acceleration to determine an estimated side-slip velocity of the vehicle. The limited-frequency integrator includes a feedback control loop which incorporates a cutoff frequency for the integrator.

The estimated side-slip acceleration is determined based on a yaw rate, a lateral acceleration, and a speed of the vehicle. A reset logic module clears an output of the limited-frequency integrator when a first condition occurs. The first condition is a straight-driving condition that is determined based on a yaw rate, a lateral acceleration, and an angle of a steering wheel of the vehicle. The first condition is a speed condition that is based on a speed of the vehicle. The first condition is a sensor bias condition that is based on the estimated side-slip acceleration.

The limited-frequency integrator includes a feedback loop which incorporates a cutoff frequency for the integrator. The cutoff frequency is determined using a Fast Fourier Transform (FFT) of the signal associated with the estimated side-slip acceleration. The cutoff frequency is preferably selected to be the minimum frequency content associated with the FFT. The cutoff frequency is preferably determined only for vehicle speeds that are above a speed threshold such that control of vehicle side-slip is a concern. A correction factor is also preferably applied to the derived cutoff frequency depending on the magnitude of the estimated side-slip acceleration.

The estimated side-slip velocity is compared to a desired side-slip velocity to produce a side-slip control signal. The side-slip control signal is combined with a yaw rate control signal to produce an actuator control signal. The actuator control signal is received by at least one brake actuator that applies a brake pressure difference across at least one axle of the vehicle to create a yaw moment to improve stability and improve the dynamic behavior of the vehicle. The actuator control signal is received by a rear-wheel steering actuator that turns a set of rear wheels of the vehicle to create the yaw moment.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
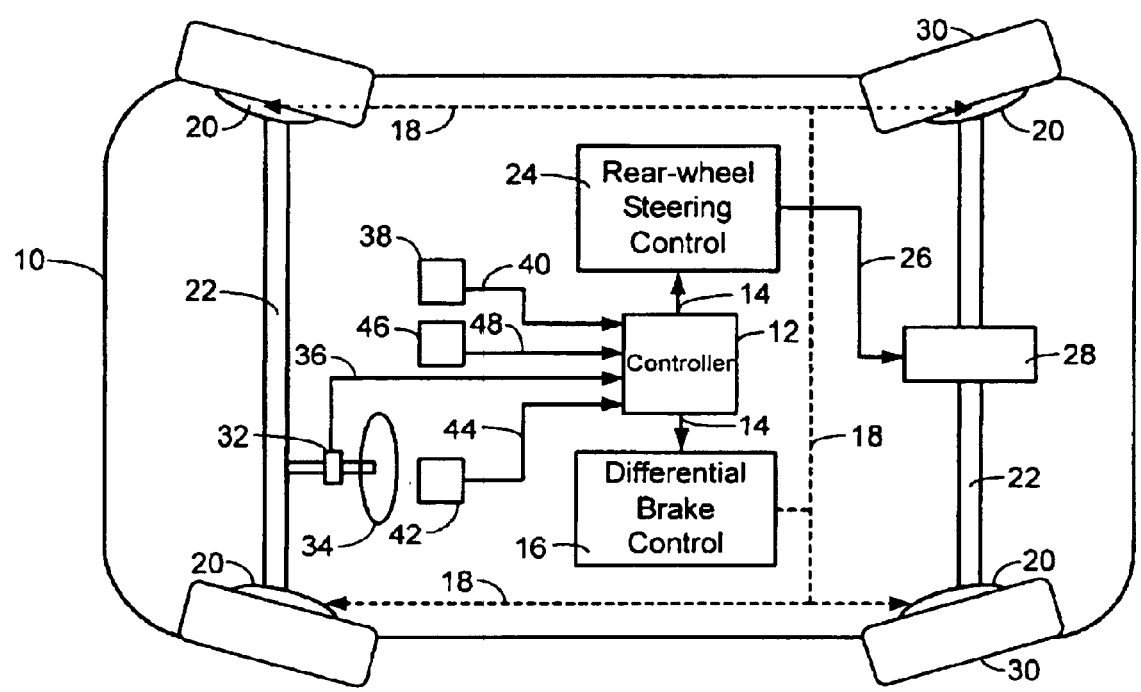
FIG. 1 is a schematic illustration of a vehicle stability enhancement system with differential braking control and rear-wheel steering control.

The following description of the preferred embodiment(s) is merely exemplary in nature and is in no way intended to limit the invention, its application, or uses. For purposes of clarity, the same reference numbers will be used in the drawings to identify similar elements.

Referring to FIG. 1, an exemplary vehicle stability enhancement system is illustrated for a vehicle 10 with rear-wheel steering and differential braking. To implement differential braking, a controller 12 sends an actuator control signal 14 to a differential brake control module 16. The differential brake control module 16 sends a brake control signal 18 to one or more brake actuators 20. The brake control signal 18 instructs the brake actuators 20 to create a brake pressure difference across at least one of the axles 22 of the vehicle 10. The brake pressure difference creates a yaw moment to correct a dynamic behavior of the vehicle 10 when there is a discrepancy between a desired yaw rate and actual yaw rate and/or a desired side-slip velocity and actual side-slip velocity of the vehicle 10.

To implement rear-wheel steering, the controller 12 sends the actuator control signal 14 to a rear-wheel steering control module 24. The rear-wheel steering control module 24 sends a steering control signal 26 to a rear-wheel steering actuator 28. The rear-wheel steering actuator 28 turns a set of rear wheels 30 of the vehicle 10 to create a yaw moment to correct the dynamic behavior of the vehicle 10. While the vehicle stability enhancement system of FIG. 1 implements both differential braking and rear-wheel steering, either system alone or other methods could be used for vehicle stability enhancement.

Whether differential braking, rear-wheel steering, or both are implemented, the controller 12 receives information about the operating conditions of the vehicle 10 from several sensors. A steering wheel angle sensor 32 detects the position of a steering wheel 34 of the vehicle 10 and sends a steering wheel angle signal 36 to the controller 12. A speed sensor 38 detects the speed of the vehicle 10 and sends a speed signal 40 to the controller 12. A lateral accelerometer 42 detects the lateral acceleration of the vehicle 10 and sends a lateral acceleration signal 44 to the controller 12. A yaw rate sensor 46 detects the yaw rate of the vehicle 10 and sends a yaw rate signal 48 to the controller 12. While the controller 12 is shown as an independent element of the vehicle 10, it may be implemented as part of a computer of the vehicle 10. Additionally, the rear-wheel steering control module 24 and the differential brake control module 16 may have independent controllers to process information collected from the sensors. The present invention may also be implemented as a feature that a driver could turn off.

Figure 2:
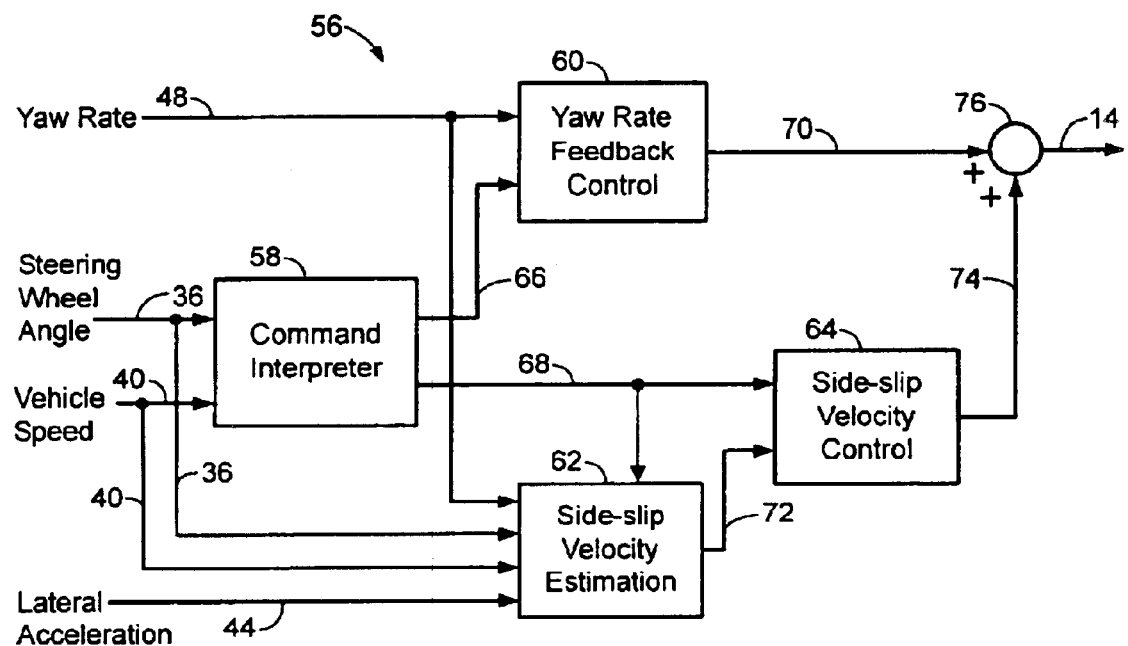
FIG. 2 is a functional block diagram of a vehicle stability enhancement control system.

Referring now to FIG. 2, the controller 12 implements a vehicle stability enhancement control system 56 that includes a command interpreter module 58, a yaw rate feedback module 60, a side-slip velocity estimation module 62, and a side-slip velocity feedback module 64. The command interpreter module 58 generates a desired yaw rate signal 66 and a desired side-slip velocity signal 68 based on the steering wheel angle signal 36 and the speed signal 40. If the values of the desired yaw rate signal 66 and/or the desired side-slip velocity signal 68 are surpassed by a predetermined threshold, it is likely the road conditions necessitate vehicle stability enhancement and a driver feels a loss of control of the vehicle 10. The predetermined threshold may be a function of the speed of the vehicle 10.

The yaw rate feedback module 60 generates a yaw rate control signal 70 by comparing the yaw rate signal 48 and the desired yaw rate signal 66. The side-slip velocity estimation module 62 generates an estimated side-slip velocity signal 72 based on the steering wheel angle signal 36, speed signal 40, and lateral acceleration signal 44. The side-slip velocity feedback module 64 generates a side-slip velocity control signal 74 by comparing the desired side-slip velocity signal 68 and the estimated side-slip velocity signal 72. A summing node 76 combines the yaw rate control signal 70 and the side-slip velocity control signal 74 to generate the actuator control signal 14. The actuator control signal 14 instructs the differential brake control module 16, the rear-wheel steering control module 24, or both to create a corrective yaw moment to correct the dynamic behavior of the vehicle 10.

Figure 3:
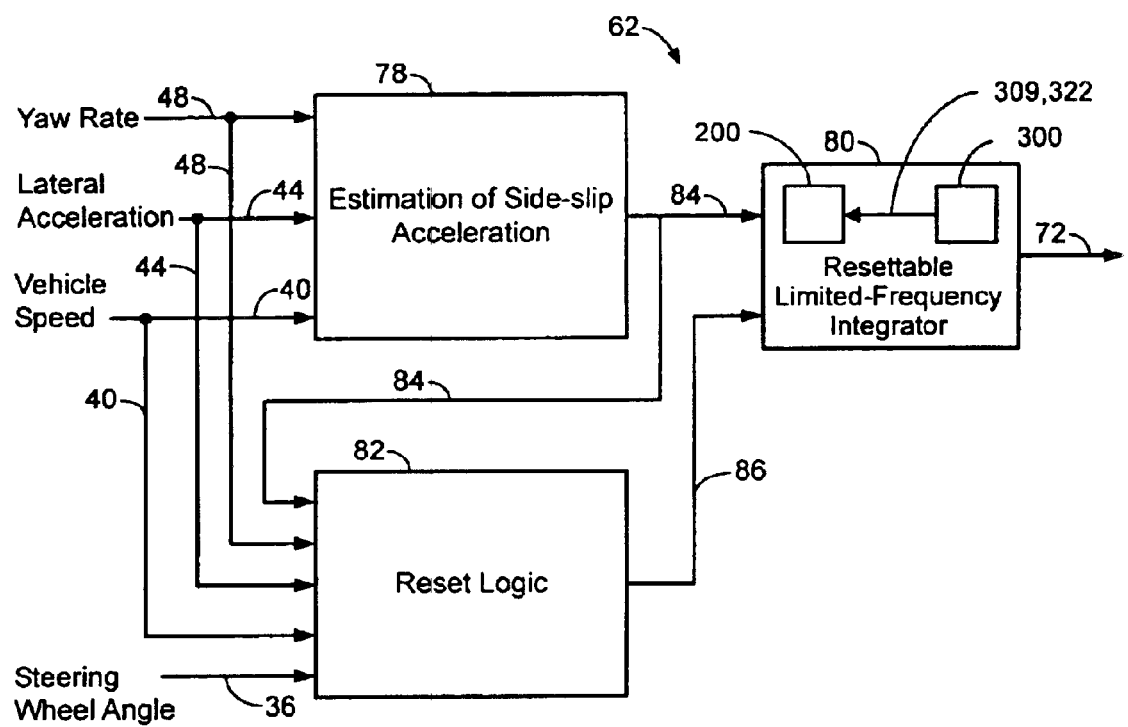
FIG. 3 is a functional block diagram of the side-slip velocity estimation module of FIG. 2.

Referring now to FIG. 3, the side-slip velocity estimation module 62 includes a side-slip acceleration estimation module 78, an integration module 80, and a reset logic module 82. The side-slip acceleration estimation module 78 generates an estimated side-slip acceleration signal 84 based on the yaw rate signal 48, lateral acceleration signal 44, and the speed signal 40. The estimated side-slip acceleration signal 84 is the integrand of the integration module 80. The integration module 80 integrates the estimated side-slip acceleration signal 84 to generate the estimated side-slip velocity signal 72. The reset logic module 82 generates a reset signal 86 based on the estimated side-slip acceleration signal 84, the lateral acceleration signal 44, the speed signal 40, and the steering wheel angle signal 36.

The integration module 80 preferably includes a resettable limited-frequency integrator. A resettable integrator works like a typical integrator to accumulate the values of the integrand when a reset command is inactive (FALSE). The resultant integral is cleared to zero when the reset command is active (TRUE). A limited-frequency integrator has a limitation on its input frequency range. If the sensors used to estimate side-slip acceleration were ideal, there would be no need to reset the integrator or limit its input frequency range. Side-slip velocity is mathematically the integration of side-slip acceleration. However, practically all sensors have bias and/or drift as understood by those skilled in the art of vehicle controls. Without resetting the integrator or limiting its input frequency, the integrator would continue to accumulate the bias and/or drift, which reduces the accuracy of the signal. Ideally, the bias and/or drift components could be estimated and removed before the integration process. However, a bias and/or drift removal process would be very difficult. Although the bias and/or drift are not removed or blocked off completely when the reset command is inactive, the accumulation during such a limited period of time is not significant enough to cause adverse effects in the control system. Limiting the input frequency range reduces the effect of steady-state or near-steady-state bias and/or drift.

The integration module 80 accepts the reset signal 86 and clears the estimated side-slip velocity signal 72 when the reset signal 86 is TRUE. The reset signal 86 is TRUE when the existing vehicle motion does not require vehicle stability enhancement. The estimated side-slip velocity signal 72 is the integral of the estimated side-slip acceleration signal 84 when the reset signal 86 is FALSE. The reset signal 86 is FALSE when the existing vehicle motion requires vehicle stability enhancement.

Figure 4:
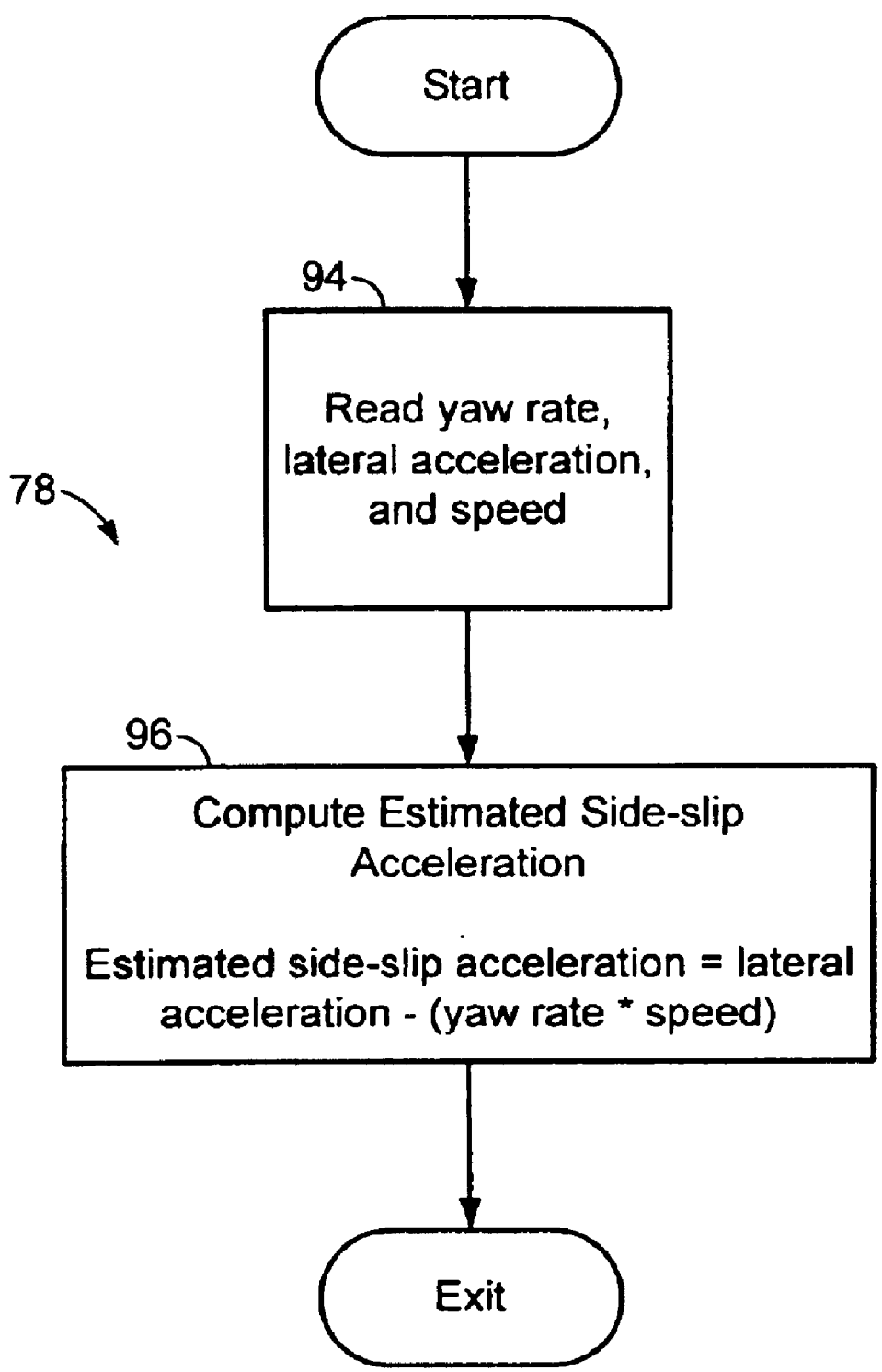
FIG. 4 is a functional block diagram of the side-slip acceleration estimation module of FIG. 3.

Referring now to FIG. 4, the side-slip acceleration estimation module 78 is further illustrated. Side-slip acceleration is estimated based on the values of the yaw rate signal 48, the lateral acceleration signal 44, and the speed signal 40. In step 94, the controller 12 reads the current value of the yaw rate signal 48, lateral acceleration signal 44, and speed signal 40. In step 96, the estimated side-slip acceleration is calculated. The product of the yaw rate and speed is subtracted from the lateral acceleration. The result is the value of the estimated side-slip acceleration signal 84.

Figure 5:
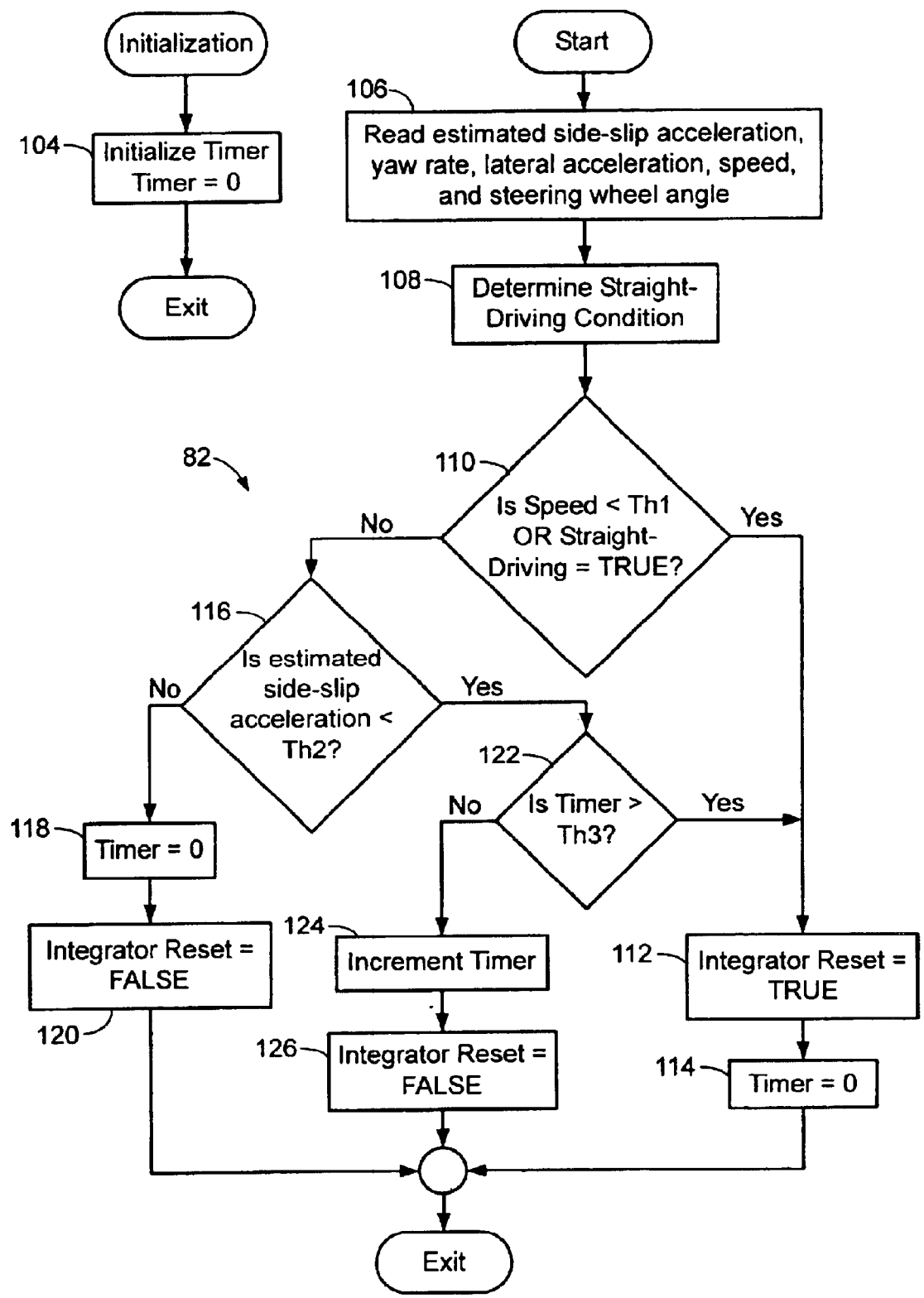
FIG. 5 is a functional block diagram of the reset logic module of FIG. 3.

Referring now to FIG. 5, the reset logic module 82 is further illustrated. In step 104, a timer is initialized and set to zero. Step 104 is preferably performed before the reset logic module 82 is executed for the first time after the vehicle 10 is turned on. In step 106, the controller 12 reads the current values of the estimated side-slip acceleration signal 84, the yaw rate signal 48, the speed signal 40, and the steering wheel angle signal 36. In step 108, the controller 12 determines a straight-driving condition that indicates whether the vehicle 10 is turning or not. In step 110, the controller 12 proceeds to step 112 if the speed of the vehicle 10 is below a first threshold value or the straight-driving condition is TRUE. In step 112, the reset signal 86 is set to TRUE and the output of the integration module 80 is cleared. Following step 112, the controller 12 resets the timer to zero in step 114. The fact that the vehicle 10 is not turning and/or is traveling below a threshold speed, 10 miles per hour for example, indicates that there is no potential need for vehicle stability enhancement.

If the speed of the vehicle 10 is above the first threshold and the straight-driving condition is FALSE, the controller 12 proceeds from step 110 to step 116. The fact that the vehicle 10 is turning and the speed is above a first threshold value indicates the potential need for vehicle stability enhancement. In step 116, the controller 12 proceeds to step 118 if the absolute value of the estimated side-slip acceleration is above a second threshold value. When the estimated side-slip acceleration is above the second threshold value, it is likely that the value of the estimated side-slip acceleration signal 84 is caused by genuine vehicle motion and not sensor bias or drift. In step 118, the timer is reset to zero and the controller 12 proceeds to step 120. The reset signal 86 is set to FALSE and the output of the integration module 80 is the estimated side-slip velocity.

If the absolute value of the estimated side-slip acceleration is below the second threshold, 0.02 g for example, the controller 12 proceeds to step 122. In step 122, the controller 12 proceeds to step 124 when the timer is below a third threshold value. Step 124 increments the timer and the controller 12 proceeds to step 126. The reset signal 86 is set to FALSE and the output of the integration module 80 is the estimated side-slip velocity. When the absolute value of the estimated side-slip acceleration is above the second threshold and the timer is above the third threshold, it is likely that the value of the estimated side-slip acceleration is actually caused by sensor bias and drift and not genuine vehicle motion. If the timer is above the third threshold, two seconds for example, the controller 12 proceeds to step 112.

Figure 6:
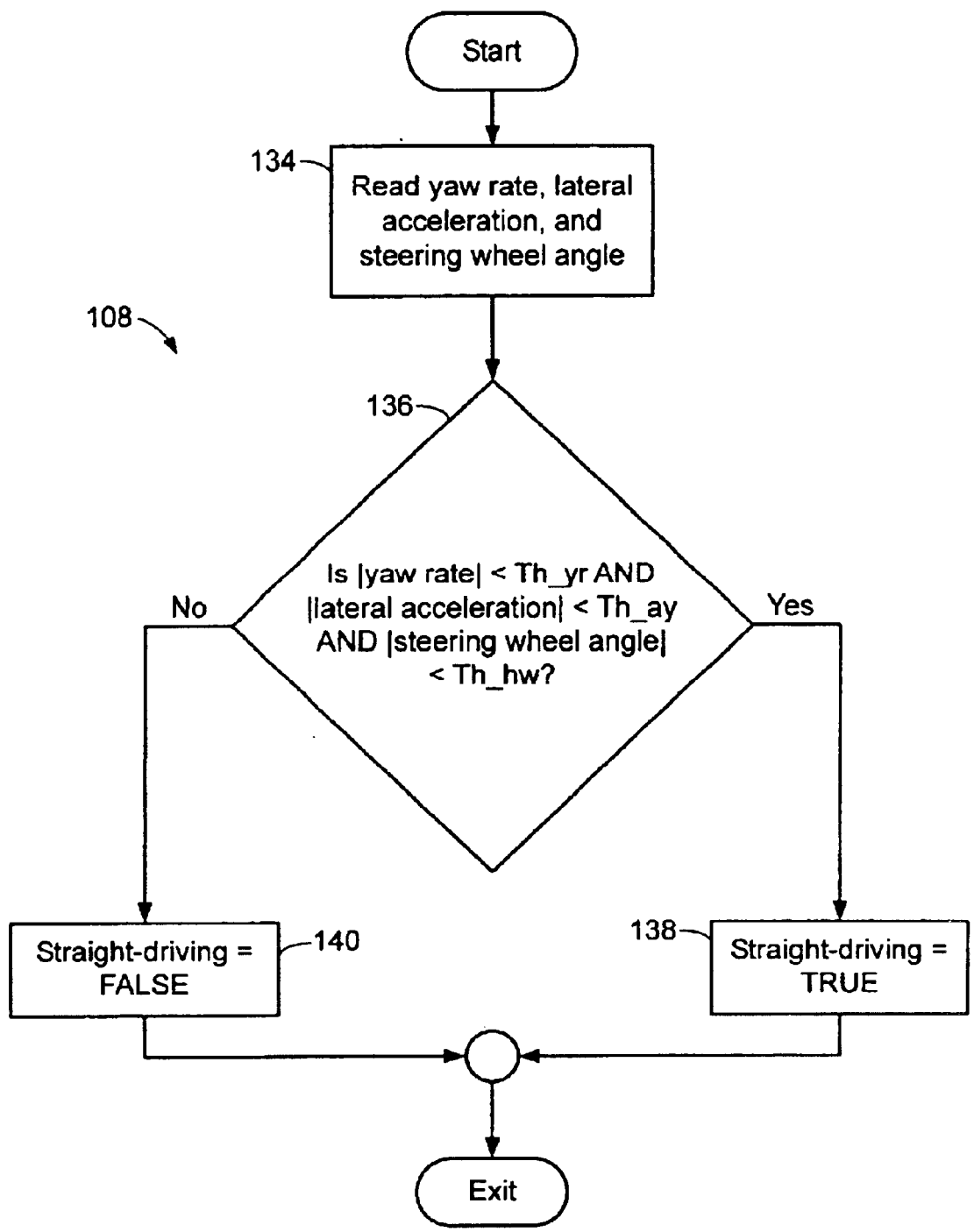
FIG. 6 is a functional block diagram of the straight-driving condition module of FIG. 5.

Referring now to FIG. 6, step 108 of FIG. 5 is further illustrated. In step 134, the controller 12 reads the current values from the yaw rate signal 48, the lateral acceleration signal 44, and the steering wheel angle signal 36. In step 136, the controller 12 proceeds to step 138 when the absolute value of the yaw rate is less than a first threshold, the absolute value of the lateral acceleration is below a second threshold, and the steering wheel angle is below a third threshold. Otherwise, the controller 12 proceeds to step 140. Step 138 sets the straight-driving condition to TRUE, and step 140 sets the straight-driving condition to FALSE.

Figure 7:
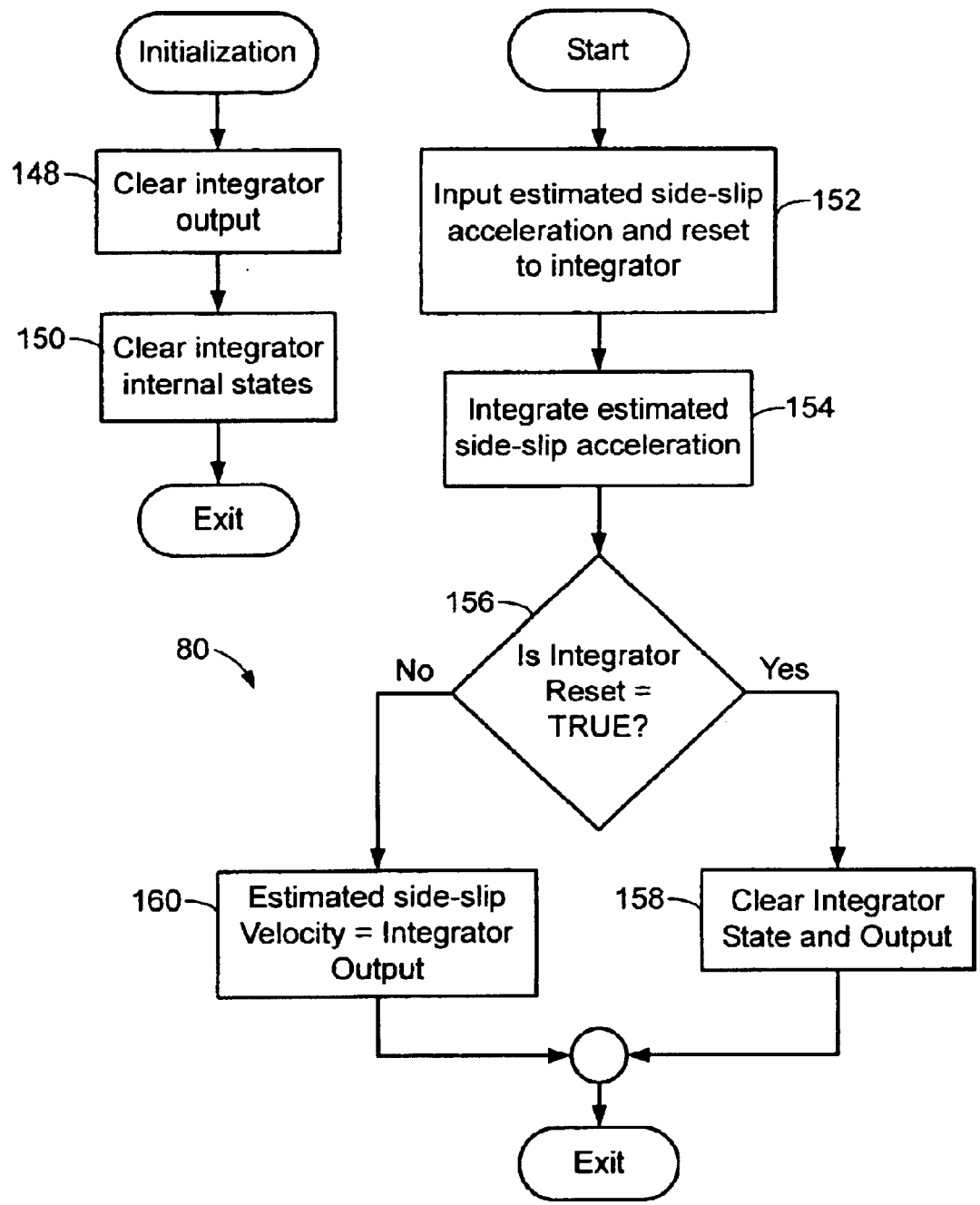
FIG. 7 is a functional block diagram of the integration module of FIG. 3.

Referring now to FIG. 7, the integration module 80 is further illustrated. In step 148, the output of the integration module 80 is cleared. In step 150, the internal states of the integration module 80 are cleared. Steps 148 and 150 are preferably performed before the integration module 80 is executed for the first time after the vehicle 10 is turned on. In step 152, the current values of the estimated side-slip acceleration signal 84 and the reset signal 86 are input to the integration module 80. In step 154, the integration module 80 integrates the estimated side-slip acceleration. In step 156, the controller 12 proceeds to step 158 when the reset signal 86 is set to TRUE. Step 158 clears the output and internal states of the integration module 80. Otherwise, the controller 12 proceeds from step 156 to step 160 when the reset signal 86 is FALSE. At step 160, the output of the integration module 80 is the value of the estimated side-slip velocity signal 72.

Figure 8:
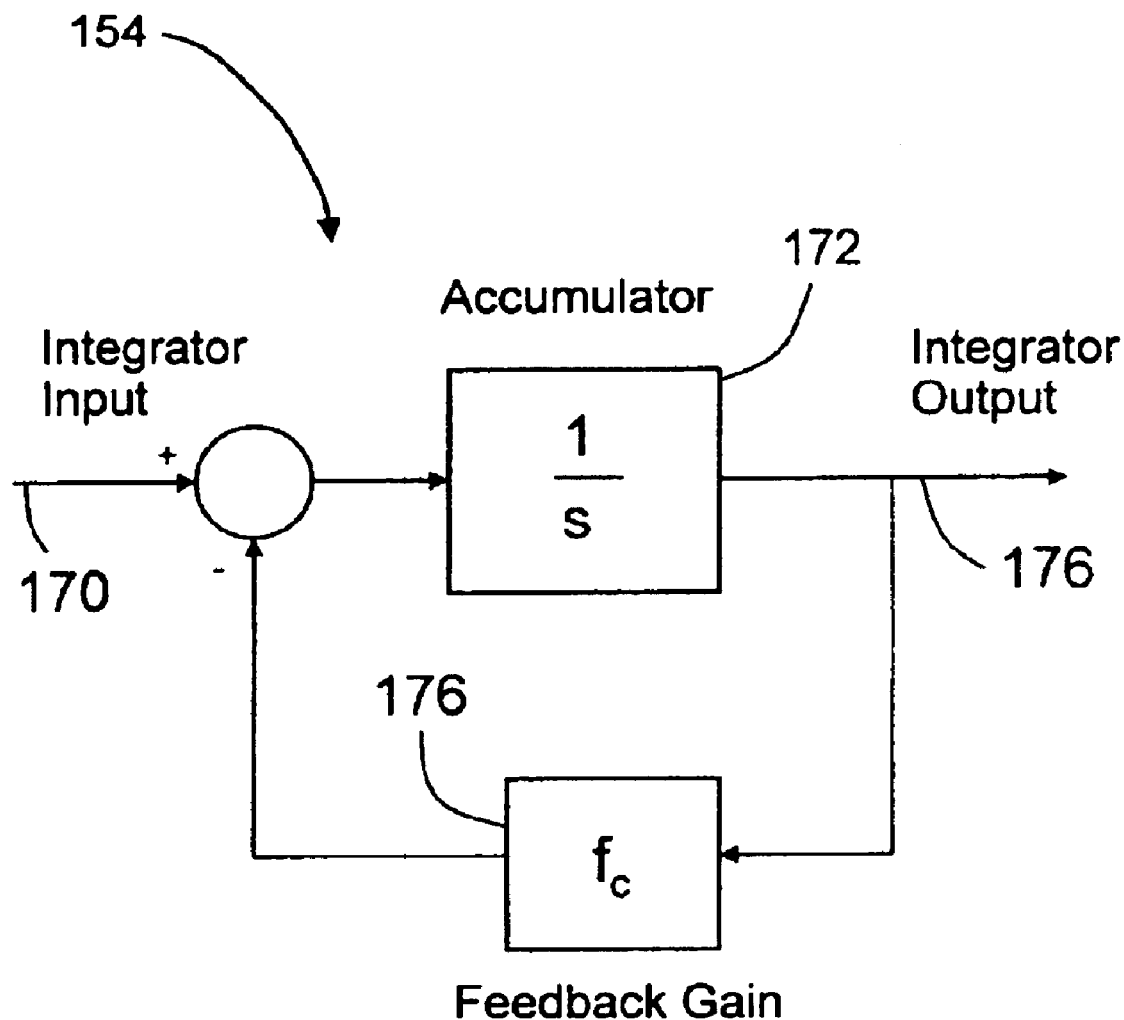
FIG. 8 is a functional block diagram of a limited-frequency integrator including a feedback loop.

Referring now to FIG. 8, step 154 of FIG. 7 is further illustrated. The input to the integration module 80 has a limit on its frequency range. This is to ensure that sensor bias or drift does not have a significant effect on the estimation of vehicle side-slip velocity. The sensor bias or drift is typically a steady-state or near-steady-state condition with a near-zero frequency. By continually feeding back an updated cutoff frequency designed and determined so as to cutoff frequencies associated with sensor bias or drift as the limit on the frequency range of the integration module 80, it is possible to maximize the integrated signal while at the same time minimizing sensor bias or drift in the integrated signal.

Referring to FIGS. 8–12, an exemplary embodiment of a method of determining an appropriate cutoff frequency for the integration module 80 which includes a feedback loop is described. Referring to FIG. 8, a feedback gain 176 is multiplied by the integrator output signal 174 and offsets the input signal 170. The feedback gain 176 is chosen to be a frequency below which the integration of the input signal 170 is to be limited, as understood by those skilled in the art of system dynamics. When the frequency of the input signal 170 is significantly larger than the feedback gain 176, the limited-frequency integrator behaves like a standard integrator. When the frequency of the input signal 170 is below the feedback gain 176, the limited-frequency integrator behaves like a process with a constant gain that is determined by the feedback gain 176. Therefore, signals due to sensor bias will not be integrated and will be limited to a component that is the product of the magnitude of the bias and the feedback gain.

Referring to FIG. 2, as described herein, the side-slip velocity feedback module 64 generates a side-slip velocity control signal 74 by comparing the desired side-slip velocity signal 68 and the estimated side-slip velocity signal 72. It is preferred that side-slip velocity feedback module 64 generates a side-slip velocity control signal 74 in order to enable slip velocity feedback control by a comparison of the desired side-slip velocity signal 68 and the estimated side-slip velocity signal 72 which comprises an estimation of the side-slip error. The side-slip error, $E_{Vy}$, as determined in this process is an important element in the process of improving the side-slip velocity feedback control according to this invention.

The side-slip velocity error ($E_{Vy}$) may be determined by taking the difference of a desired side-slip velocity ($V_{y\_desired}$) and the actual side-slip velocity, or as described herein, an estimate of the side-slip velocity, such as feedback side-slip velocity ($V_{y\_feedback}$), as illustrated in the following equation:

$$E_{Vy} = V_{y\_desired} - V_{y\_feedback} \quad (1)$$

The accuracy of the side-slip velocity error and thus the accuracy and usefulness of side-slip velocity feedback module 64 is dependent upon on an accurate measurement of actual vehicle side-slip velocity, such as feedback side-slip velocity ($V_{y\_feedback}$) or, as described herein, on an accurate estimate of the side-slip velocity, as well as an accurate and representative value of the desired side-slip velocity ($V_{y\_desired}$). The desired side-slip velocity is preferably determined by a command interpreter as disclosed in commonly assigned U.S. Pat. No. 6,122,584, which is hereby incorporated herein by reference in its entirety. While determination of the actual side-slip velocity is desirable, a side-slip velocity sensor is generally very expensive and thus, not well suited to broad application in vehicles that are intended for high volume production.

Since direct determination of the actual side-slip velocity is generally not technically or economically feasible in mass produced vehicles given the current state of the art with respect to side-slip velocity sensors and sensing methods, it is presently desirable to determine an estimate of the side-slip velocity. An estimate of the side-slip velocity ($V_y$) may be obtained by integration of the vehicle side-slip acceleration. Side-slip acceleration can be determined according to the relationship comprising:

$$\dot{V}_y = a_y - r(V_x) + B = \dot{V}_{y\_measured} + B, \quad (2)$$

where: $a_y$ is the lateral acceleration, r is the yaw rate, $V_x$ is the vehicle speed, B is the sensor bias or drift, $\dot{V}_{y\_measured}$ is the side-slip acceleration (or derivative of side slip velocity) that is calculated from the measured quantities noted above, and $\dot{V}_y$ or $V_{y_{din}}$ is the calculated side-slip acceleration. Since the sensor bias or drift is frequently difficult to characterize accurately, this calculation may also be generally characterized as an estimate of the side-slip acceleration.

In a direct integration, the expression of the Laplace transform is:

$$\tilde{V}_y(s) = \frac{1}{s}[\dot{V}_{y\_measured}(s) + B(s)], \quad 3)$$

where: $\tilde{V}_y(s)$ is the estimated integration result, $\dot{V}_{y\_measured}$ is the measured derivative signal, s is the representation of the complex variable associated with the Laplace transform and B(s) is the sensor bias. Since signals from sensors associated with the quantities used to determine $\dot{V}_{y\_measured}$ generally contain bias and drift, a direct integration will cause the integration to accumulate the bias and drift and render inaccurate and undesirable results. Therefore, it is desirable to design an integration process with limited bandwidth so as to limit, or preferably to exclude, the sensor bias and drift from the integration results.

A limited bandwidth integration may be accomplished according to the relationship comprising:

$$\tilde{V}_y(s) = \frac{1}{(s+f_c)}[\dot{V}_{y\_measured}(s) + B(s)], \quad (4)$$

where $f_r$ is the cutoff frequency of the integration and is selected so as to limit the effects of sensor bias and drift. Since $\dot{V}_{y\_measured}$ may be expressed as:

$$\dot{V}_{y\_measured}(s) = sV_{y\_measured}(s) + V_{y\_measured}(0) \quad (5)$$

Assuming a zero initial condition, $\dot{V}_{y\_measured}$ may be expressed as $$\dot{V}_{y\_measured}(s) = sV_{y\_measured}(s), \quad (6)$$

and by substitution in equation (4), $\tilde{V}_y(s)$ may be expressed as:

$$\tilde{V}_y(s) = \frac{s}{(s+f_c)}V_{y\_measured}(s) + \frac{1}{(s+f_c)}B(s). \quad (7)$$

Therefore, the transfer function from input $X_m(s)$ to output $\tilde{V}_y(s)$, may be expressed according to the relationship comprising:

$$\frac{\tilde{V}_y(s)}{V_{y\_measured}(s)} = G(s) = \frac{s}{(s+f_c)}, \quad (8)$$

while the transfer function from the bias $B(s)$ to $\tilde{V}_y(s)$ may be expressed according to the relationship comprising:

$$\frac{\tilde{V}_y(s)}{B(s)} = H(s) = \frac{1}{(s+f_c)}. \quad (9)$$

In order to minimize the overall error associated with the accuracy of integration and the effect of the bias, a cost function associated with bias and drift may be developed utilizing these transfer functions, and may be expressed according to the relationship comprising:

$$J = w_1[|G(jw)| - 1]^2 + w_2|H(jw)|^2 \quad (10)$$
$$= w_1\left(\frac{w}{\sqrt{w^2+f_c^2}} - 1\right)^2 + w_2\left(\frac{1}{\sqrt{w^2+f_c^2}}\right)^2,$$

where: w is the system operating frequency under consideration, for example, the vehicle natural frequency at certain operating condition, and $w_1$ and $w_2$ are weighting factors for the cost function, wherein $w_1+w_2=1$. Then, the derivative of the cost function may be taken, according to the relationship comprising:

$$\frac{dJ}{dw} = \quad (11)$$
$$2w_1\left[\frac{w}{\sqrt{w^2+f_c^2}} - 1\right]\left[\frac{1}{\sqrt{w^2+f_c^2}} - \frac{w^2}{\sqrt{(w^2+f_c^2)^3}}\right] - \frac{2w_2 w}{(w^2+f_c^2)^2},$$

In order to establish the minimum of the cost function, the equation may be solved for $$\frac{dJ}{dw} = 0.$$

The result is a complex equation which may be solved for the cutoff frequency, $f_r$, and expressed according to the general form comprising:

$$f_r = f(w_1, w_2, w) \quad (12)$$

A Fast Fourier Transform (FFT) of the signal associated with the side-slip acceleration is used to determine the frequency content of the side-slip acceleration. It is also preferred that a correction factor be applied to the derived cutoff frequency based on the magnitude of the side-slip acceleration.

Figure 9:
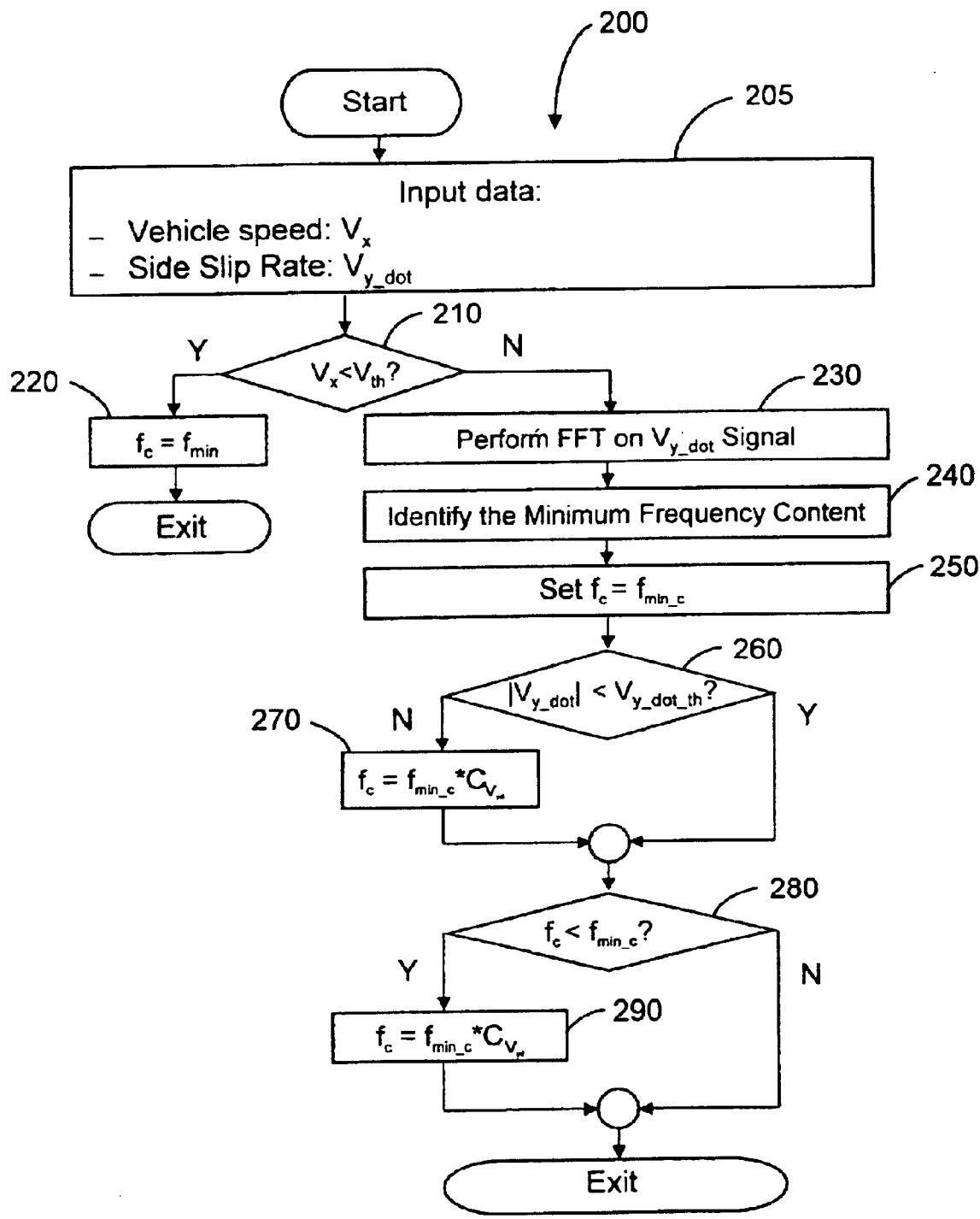
FIG. 9 is a flowchart illustrating the operation of the side-slip velocity feedback control and the calculation of the cutoff frequency which is used to establish the feedback gain.

FIGS. 9–12 illustrate one embodiment of a method 200 for determining the cutoff frequency, $f_r$, using the techniques described above and the associated output. Method 200 is preferably implemented using control logic in controller 12, such as control logic utilized in conjunction with side-slip velocity estimation module 62. Referring to FIGS. 3, 8 and 9, method 200 comprises a step of obtaining 205 the vehicle speed, $V_x$, such as vehicle speed 40 and the vehicle side-slip velocity rate, $\dot{V}_y$ or $V_{y\_dot}$, such as side-slip velocity rate 170. Referring again to FIG. 9, method 200 also comprises a step of determining 210 whether the vehicle speed falls below a threshold speed, $V_{th}$, for example about 10 kph. The threshold speed varies as a function of the vehicle and its characteristics, the vehicle load, and roadway type and condition.

If the vehicle speed falls below the threshold speed, the method 200 employs the step of setting 220 the cutoff frequency, $f_r$, to a predetermined minimum frequency, $f_{min}$, for example, 0.001 (generally speaking a number that is close to zero but not zero). This step avoids the need to perform additional signal processing, as described below, for vehicle speeds that result in negligible vehicle side-slip. The vehicle threshold speed is selected such that the side-slip velocity of the vehicle is negligible at vehicle speeds which are below the threshold.

Figure 10:
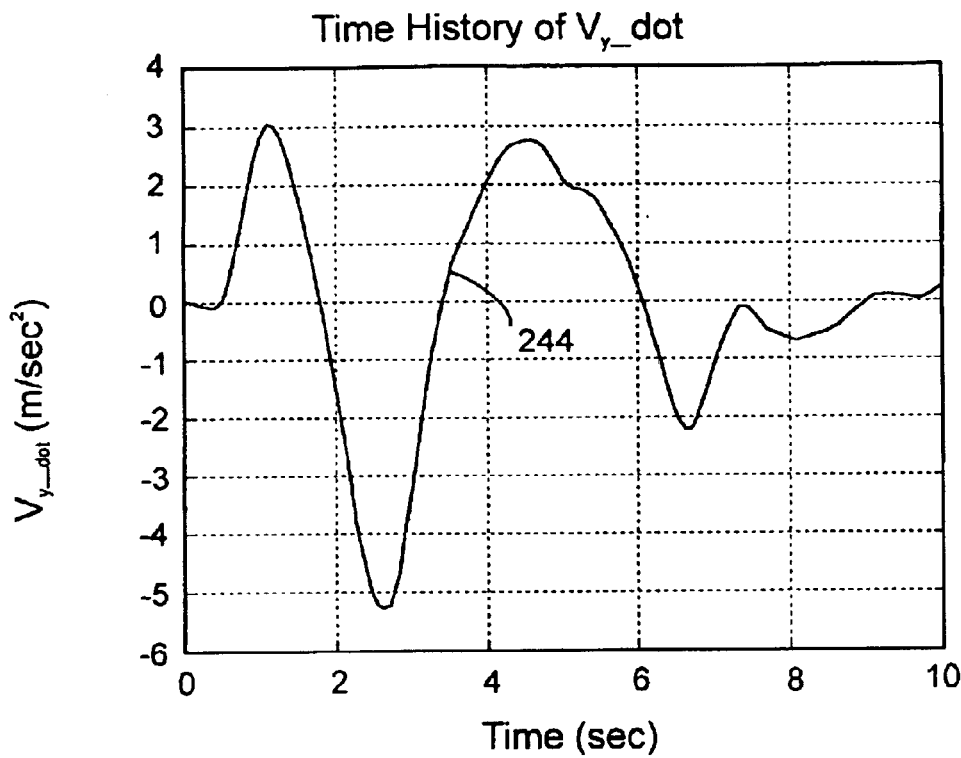
FIG. 10 is an exemplary plot of the estimated vehicle side-slip acceleration signal as a function of time with the presence of sensor bias.
Figure 11:
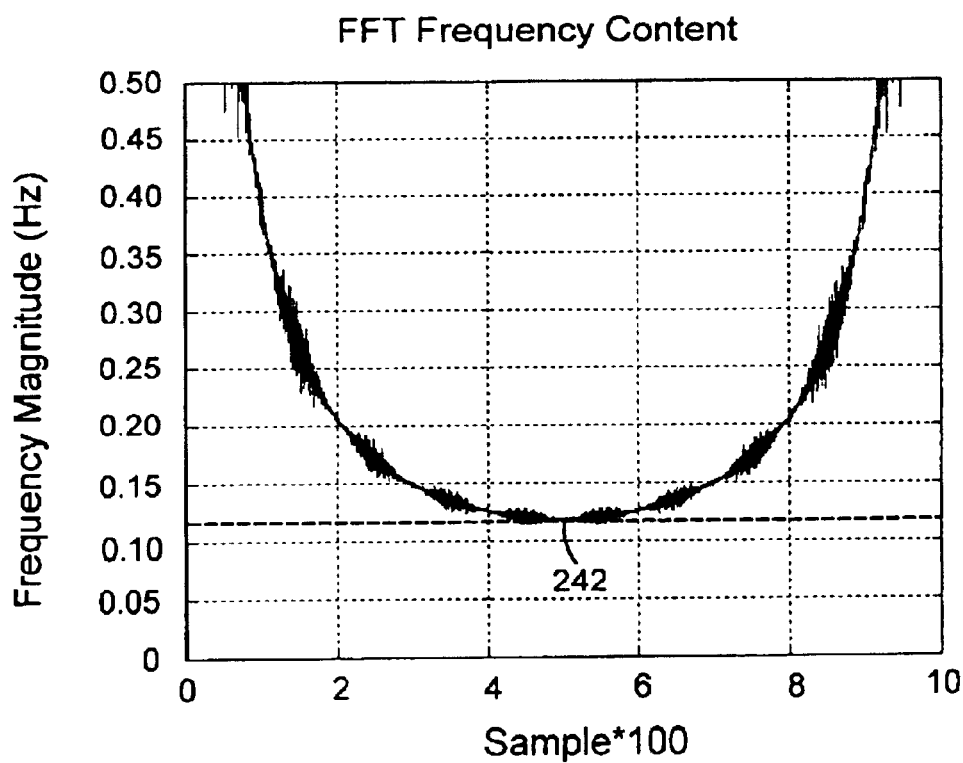
FIG. 11 is a plot of the FFT of the $V_{y\_dot}$ signal versus time data of FIG. 10 illustrating the magnitude of the frequency component of this signal plotted in the frequency domain.

If the vehicle speed is greater than or equal to the vehicle speed threshold, method 200 employs a step of performing 230 FFT processing of the estimated side-slip acceleration signal 84, $\dot{V}_{y\_measured}$, to determine its frequency content. FIGS. 10 and 11 illustrate the frequency content (see FIG. 12) of the time-based signal associated with $\dot{V}_y$ or $V_{y\_dot}$ (see FIG. 10) which results from using FFT to transform the time-based signal to plot its frequency-based content or constituents. Such signal processing can be performed using a commercially available FFT processor based on well known digital signal processing (DSP) apparatus and methods. Such DSP methods and apparatus may be incorporated into controller 12 in the form of associated software and hardware or may comprise a separate FFT control module that is in signal communication with controller 12. FIG. 10 shows an example of the time trace 244 of $\dot{V}_y$ or $V_{y\_dot}$, and FIG. 11 shows an example of the frequency-based transform of the signal shown in FIG. 10 performed using the FFT method and apparatus.

Method 200 also includes a step of identifying 240 the minimum value of the frequency content 242 from the FFT, for example 0.12 Hz, as illustrated in FIG. 11. This minimum may also be determined using known signal analysis apparatus and methods. Once the minimum has been identified, method 200 also comprises a step of setting 250 the cutoff frequency equal to the minimum value of the frequency content, $f_{min\_c}$.

Method 200 also includes a step of determining 260 whether the absolute value or magnitude of the estimated vehicle side-slip acceleration, $V_{y\_dot}$, is less than a predetermined side-slip acceleration threshold, $V_{y\_dot\_th}$, for example 1 m/s². This test is utilized to adjust the value of the cutoff frequency in the case of excessive side-slip acceleration. If the absolute value of the estimated side-slip acceleration is greater than the predetermined side-slip acceleration threshold, for example 1 m/sec², method 200 also includes a step of factoring 270 the cutoff frequency using a frequency correction factor, $C_{V_{yd}}$, or gain to reduce the value of the cutoff frequency and account for the effect of excessive side-slip acceleration, and method 200 continues to block 280 described below. $C_{V_{yd}}$ is determined empirically based on the magnitude of the side-slip acceleration. The frequency correction factor may be stored in a look-up table within the controller 12, as shown in the examples provided in Table 1.

TABLE 1

$C_{V_{yd}}$ as a Function of $V_{y\_doi}$

| Side-Slip Acceleration (m/s²) | 1 | 3 | 5 | 7 | 10 |
|---|---|---|---|---|---|
| Frequency Correction Factor | 1 | 0.7 | 0.1 | 0.05 | 0.01 |

If the estimated side-slip acceleration is less than or equal to the predetermined side-slip acceleration threshold, the cutoff frequency is unaffected, and remains equal to the minimum value of the frequency content, $f_{min\_c}$, and method 200 continues to step 280.

Method 200 includes an additional step of determining 280 whether the value of the cutoff frequency, either following the application of the correction factor in step 260 or as established in step 250, is less than the minimum value of the frequency content. This is essentially a test of whether the value of the frequency correction factor is less than one. If the value of the correction factor is less than one, the cutoff frequency is determined 290 to be the product of the correction factor and the minimum value of the frequency content. If the value of the frequency correction factor is greater than or equal to one, no correction factor is applied and the value of the cutoff frequency remains equal to the minimum value of the frequency content, $f_{min\_c}$.

Figure 12:
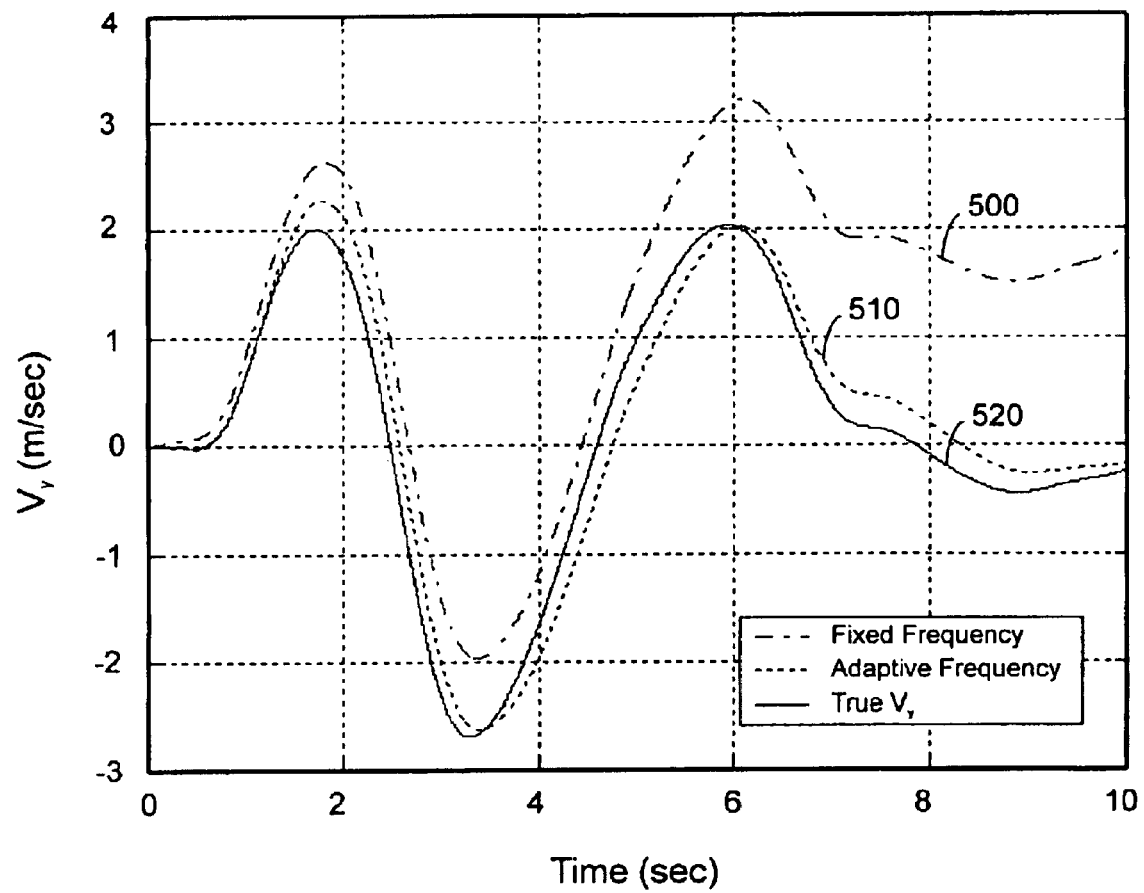
FIG. 12 is a plot of actual side-slip velocity, estimated side-slip velocity which did not incorporate the feedback control of the present invention and estimated side-slip velocity incorporating the cutoff frequency based feedback control of the present invention as a function of time.

Referring now to FIG. 12, the effect of side-slip velocity estimation is illustrated with and without the presence of sensor bias and drift. The estimated side slip velocity obtained using a fixed cutoff frequency as a function of time is shown in time trace 500. As may be seen, while providing a very useful estimate, it has a tendency to overestimate the side slip velocity in the example provided as compared to the actual side-slip velocity shown as a function of time in time trace 520, due to the influence of sensor bias and drift. The actual side-slip velocity was measured by instrumenting a vehicle with a commercially available side-slip velocity sensor. The estimated side-slip velocity obtained using the adaptive cutoff frequency according to the present invention as a function of time is shown in time trace 510. As may be readily seen, the estimated side-slip velocity according to the present invention compares quite closely to the actual side-slip velocity owing to the reduction of the effects of sensor bias and drift.

The present invention provides for improved vehicle stability enhancement including a more accurate estimation of vehicle side-slip velocity. This is achieved with little software overhead and without additional hardware costs over and above the existing state-of-the-art stability enhancement systems.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A side-slip velocity estimation module for a vehicle stability enhancement control system, comprising:
    a side-slip acceleration estimation module that determines an estimated side-slip acceleration of a vehicle, said side-slip acceleration module having an estimated side-slip acceleration signal associated therewith; and
    a limited-frequency integrator that integrates the estimated side-slip acceleration to determine an estimated side-slip velocity of the vehicle, said limited frequency integrator having a feedback loop, the feedback loop comprising a cutoff frequency; wherein the cutoff frequency is determined in relation to a speed of the vehicle and the estimated side-slip acceleration.

2. The side-slip velocity estimation module of claim 1, wherein the estimated side-slip acceleration is determined based on a yaw rate, a lateral acceleration, and the speed of the vehicle.

3. The side-slip velocity estimation module of claim 1, further comprising:
    a reset logic module that clears an output of said limited-frequency integrator when a first condition occurs.

4. The side-slip velocity estimation module of claim 3, wherein the first condition is a straight-driving condition that is determined based on a yaw rate, a lateral acceleration, and an angle of a steering wheel of the vehicle.

5. The side-slip velocity estimation module of claim 3, wherein the first condition is a speed condition that is based on the speed of the vehicle.

6. The side-slip velocity estimation module of claim 3, wherein the first condition is a sensor bias condition that is based on the estimated side-slip acceleration.

7. The side-slip velocity estimation module of claim 1, wherein the cutoff frequency of said limited-frequency integrator is determined in relation to a vehicle speed threshold, and wherein if the speed of the vehicle is less than the vehicle speed threshold, the cutoff frequency is set to a predetermined minimum frequency, and wherein if the speed of the vehicle is greater than or equal to the vehicle speed threshold, the cutoff frequency is determined in relation to the estimated side-slip acceleration.

8. The side-slip velocity estimation module of claim 7, wherein the cutoff frequency is determined in relation to the estimated side-slip acceleration using a fast Fourier transform of the estimated side-slip acceleration signal to determine the frequency content thereof.

9. The side-slip velocity estimation module of claim 8, wherein the cutoff frequency is determined from a minimum of the frequency content of the fast Fourier transform of the estimated side-slip acceleration signal.

10. The side-slip velocity estimation module of claim 9, wherein the cutoff frequency is determined in relation to a predetermined side-slip acceleration threshold, and wherein if the estimated side-slip acceleration of the vehicle is less than the predetermined side-slip acceleration threshold, the cutoff frequency is set to the minimum of the frequency content, and wherein if the estimated side-slip acceleration of the vehicle is greater than or equal to the predetermined side-slip acceleration threshold, the cutoff frequency is set to the minimum of the frequency content factored by a frequency correction factor for values of the frequency correction factor less than 1, and for all other values of the frequency correction factor is set to the minimum of the frequency content.

11. The side-slip velocity estimation module of claim 1, wherein the estimated side-slip velocity is compared to a desired side-slip velocity to produce a side-slip control signal.

12. The side-slip velocity estimation module of claim 11, wherein the side-slip control signal is combined with a yaw rate control signal to produce an actuator control signal.

13. The side-slip velocity estimation module of claim 12, wherein the actuator control signal is received by at least one brake actuator that applies a brake pressure difference across at least one axle of the vehicle to create a yaw moment to correct a dynamic behavior of the vehicle.

14. The side-slip velocity estimation module of claim 12, wherein the actuator control signal is received by a rear-wheel steering actuator that turns a set of rear wheels of the vehicle to create a yaw moment to correct a dynamic behavior of the vehicle.

15. A method of side-slip velocity estimation for a vehicle stability enhancement control system, comprising the steps of:
    determining an estimated side-slip acceleration of a vehicle; and
    integrating the estimated side-slip acceleration to determine an estimated side-slip velocity of the vehicle, wherein the estimated side-slip acceleration is integrated with a limited-frequency integrator having a feedback loop, the feedback loop comprising a cutoff frequency; wherein the cutoff frequency is determined in relation to a speed of the vehicle and the estimated side-slip acceleration.

16. The method of claim 15, wherein the estimated side-slip acceleration is determined based on a yaw rate, a lateral acceleration, and the speed of the vehicle.

17. The method of claim 15, further comprising a step of:
    clearing an output of the limited-frequency integrator when a first condition occurs.

18. The method of claim 17, wherein the first condition is a straight-driving condition that is determined based on a yaw rate, a lateral acceleration, and an angle of a steering wheel of the vehicle.

19. The method of claim 17, wherein the first condition is a speed condition that is based on the speed of said vehicle.

20. The method of claim 17, wherein the first condition is a sensor bias condition that is based on the estimated side-slip acceleration.

21. The method of claim 15, further comprising:
determining the cutoff frequency of the limited-frequency integrator in relation to a vehicle speed threshold, wherein if the speed of the vehicle is less than the vehicle speed threshold, the cutoff frequency is set to a predetermined minimum frequency, and wherein if the speed of the vehicle is greater than or equal to the vehicle speed threshold, the cutoff frequency is determined in relation to the estimated side-slip acceleration.

22. The method of claim 21, further comprising:
determining the cutoff frequency in relation to the estimated side-slip acceleration using a fast Fourier transform of an estimated side-slip acceleration signal to determine the frequency content thereof.

23. The method of claim 22, further comprising:
determining a minimum of the frequency content of the fast Fourier transform of the estimated side-slip acceleration signal.

24. The method of claim 23, further comprising:
determining the cutoff frequency in relation to a predetermined side-slip acceleration threshold, wherein if the estimated side-slip acceleration of the vehicle is less than the predetermined side-slip acceleration threshold, the cutoff frequency is set to the minimum of the frequency content, and wherein if the estimated side-slip acceleration of the vehicle is greater than or equal to the predetermined side-slip acceleration threshold, the cutoff frequency is set to the minimum of the frequency content factored by a frequency correction factor for values of the frequency correction factor less than 1, and for all other values of the frequency correction factor is set to the minimum of the frequency content.

25. The method of claim 17, further comprising:
comparing the estimated side-slip velocity to a desired side-slip velocity to produce a side-slip control signal.

26. The method of claim 25, further comprising:
combining the side-slip control signal with a yaw-rate control signal to produce an actuator control signal.

27. The method of claim 26, further comprising:
transmitting said actuator control signal to at least one brake actuator; and
applying a brake pressure difference across at least one axle of said vehicle to create a yaw moment to correct a dynamic behavior of the vehicle.

28. The method of claim 26, further comprising:
transmitting the actuator control signal to a rear-wheel steering actuator; and
turning a set of rear wheels of said vehicle to create a yaw moment to correct a dynamic behavior of the vehicle.

* * * * *